(12) United States Patent
Teeter et al.

(10) Patent No.: US 11,836,281 B2
(45) Date of Patent: Dec. 5, 2023

(54) LOCKING APPARATUS FOR SECURING A TRANSCEIVER MODULE

(71) Applicant: Dell Products L.P., Round Rock, TX (US)

(72) Inventors: Victor B. Teeter, Round Rock, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 416 days.

(21) Appl. No.: 17/147,291

(22) Filed: Jan. 12, 2021

(65) Prior Publication Data
US 2022/0222388 A1    Jul. 14, 2022

(51) Int. Cl.
*G06F 21/88* (2013.01)
*G02B 6/42* (2006.01)
*G06F 1/18* (2006.01)

(52) U.S. Cl.
CPC ........... *G06F 21/88* (2013.01); *G02B 6/4246* (2013.01); *G06F 1/182* (2013.01); *G06F 2200/1639* (2013.01)

(58) Field of Classification Search
CPC .......... G06F 21/88; G06F 21/86; G06F 1/182; G06F 2200/1639; G02B 6/4246
See application file for complete search history.

(56) References Cited

U.S. PATENT DOCUMENTS

| | | | | |
|---|---|---|---|---|
| 8,909,053 | B2* | 12/2014 | Brassil | H04L 5/0042 398/79 |
| 8,977,126 | B2* | 3/2015 | Boyd | H04B 10/27 398/66 |
| 11,108,627 | B2* | 8/2021 | Smith | H04L 67/104 |
| 11,362,904 | B2* | 6/2022 | Ganguli | H04L 12/465 |
| 11,431,561 | B2* | 8/2022 | Smith | H04L 9/0825 |
| 11,632,176 | B2* | 4/2023 | J B | H04B 10/27 398/25 |
| 11,637,746 | B2* | 4/2023 | Smith | H04W 4/08 709/223 |
| 2020/0320854 | A1* | 10/2020 | Wachsman | G08B 26/007 |

* cited by examiner

*Primary Examiner* — Hosuk Song
(74) *Attorney, Agent, or Firm* — Jackson Walker L.L.P (57) ABSTRACT

A transceiver lock insert may include a housing, a first connector housed at least partially within the housing and configured to communicatively and mechanically couple to a transceiver module, a second connector housed at least partially within the housing and configured to communicatively and mechanically couple to a cable, transmission media communicatively coupled between the first connector and the second connector and configured to communicatively couple the transceiver module to the cable, and a lock housed within the housing and configured to, when the transceiver lock insert is inserted into the transceiver module, secure the transceiver lock insert to the transceiver module to prevent access by a person to a release mechanism of the transceiver module.

18 Claims, 7 Drawing Sheets

LOCKING APPARATUS FOR SECURING A TRANSCEIVER MODULE

TECHNICAL FIELD

The present disclosure relates in general to information handling systems, and more particularly to systems and methods for securing a transceiver module, such as an optical transceiver module, from removal or theft with a locking apparatus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system. Fiber optic cables (such as Multi-Fiber Push On or "MPO") may couple to optical transceiver modules in order to facilitate networked communication.

When a transceiver module is inserted into a transceiver slot on a switch or other information handling system, a transceiver slot latch may hold the transceiver module firmly in the slot. A transceiver release latch on the transceiver may remain flush with a side of the transceiver module until a release lever of the transceiver release latch is activated (e.g., by a user). When the release lever is activated, a retention force that mechanically maintains the transceiver module within the transceiver slot may decrease, thus permitting removal of the transceiver module.

However, the ease of removal of such transceiver modules may render them easy targets of theft. A transceiver module may be removed from a switch within seconds, and their size (e.g., the size of a human finger or smaller) may allow a thief to hide multiple transceiver modules at once on his or her person. Such transceiver modules may also be costly, ranging from $2,000 to $30,000 at the time of filing of this application, making them attractive targets for theft and black market resale.

Accordingly, systems and methods to minimize the risk of theft of transceiver modules may be desirable.

SUMMARY

In accordance with the teachings of the present disclosure, the disadvantages and problems associated with traditional transceiver modules may be reduced or eliminated.

In accordance with embodiments of the present disclose, a transceiver lock insert may include a housing, a first connector housed at least partially within the housing and configured to communicatively and mechanically couple to a transceiver module, a second connector housed at least partially within the housing and configured to communicatively and mechanically couple to a cable, transmission media communicatively coupled between the first connector and the second connector and configured to communicatively couple the transceiver module to the cable, and a lock housed within the housing and configured to, when the transceiver lock insert is inserted into the transceiver module, secure the transceiver lock insert to the transceiver module to prevent access by a person to a release mechanism of the transceiver module.

In accordance with these and other embodiments of the present disclose, a method may include housing a first connector at least partially within a housing wherein the first connector is configured to communicatively and mechanically couple to a transceiver module, housing a second connector at least partially within the housing wherein the second connector is configured to communicatively and mechanically couple to a cable, communicatively coupling transmission media between the first connector and the second connector, wherein the transmission media is configured to communicatively couple the transceiver module to the cable, and housing a lock within the housing, wherein the lock is configured to, when a transceiver lock insert is inserted into the transceiver module, secure the transceiver lock insert to the transceiver module to prevent access by a person to a release mechanism of the transceiver module.

In accordance with these and other embodiments of the present disclose, an information handling system, may include a processor, a transceiver module communicatively coupled to the processor, and a transceiver lock insert, mechanically and communicatively coupled to the transceiver module. The transceiver lock insert may include a housing, a first connector housed at least partially within the housing and configured to communicatively and mechanically couple to a transceiver module, a second connector housed at least partially within the housing and configured to communicatively and mechanically couple to a cable, transmission media communicatively coupled between the first connector and the second connector and configured to communicatively couple the transceiver module to the cable, and a lock housed within the housing and configured to, when the transceiver lock insert is inserted into the transceiver module, secure the transceiver lock insert to the transceiver module to prevent access by a person to a release mechanism of the transceiver module.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6E, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

Figure 1:
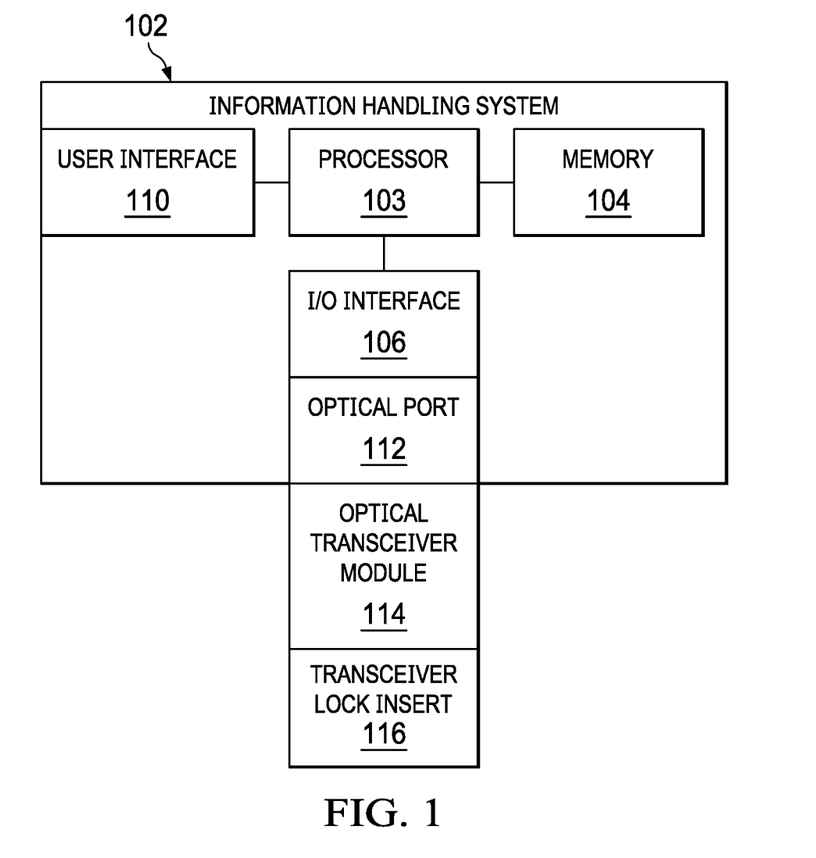
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an electrical connector in the form of any suitable combination of a jack, a socket, and/or "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include an SFP transceiver, a QSFP transceiver, or any other suitable form factor.

As shown in FIG. 1, a transceiver lock insert 116 may be inserted into optical transceiver module 114. As described in greater detail below, transceiver lock insert 116 may include a locking mechanism that may, when transceiver lock insert 116 is inserted into optical transceiver module 114, prevent activation of a mechanical release latch securing optical transceiver module 114 to optical port 112. Further, transceiver lock insert 116 may include connectors and an optical pass-through allowing for uninterrupted and unaltered transmission of data between a cable inserted into transceiver lock insert 116 and optical transceiver module 114.

In addition to processor 103, memory 104, I/O interface 106, user interface 110, optical port 112, optical transceiver module 114, and transceiver lock insert 116, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
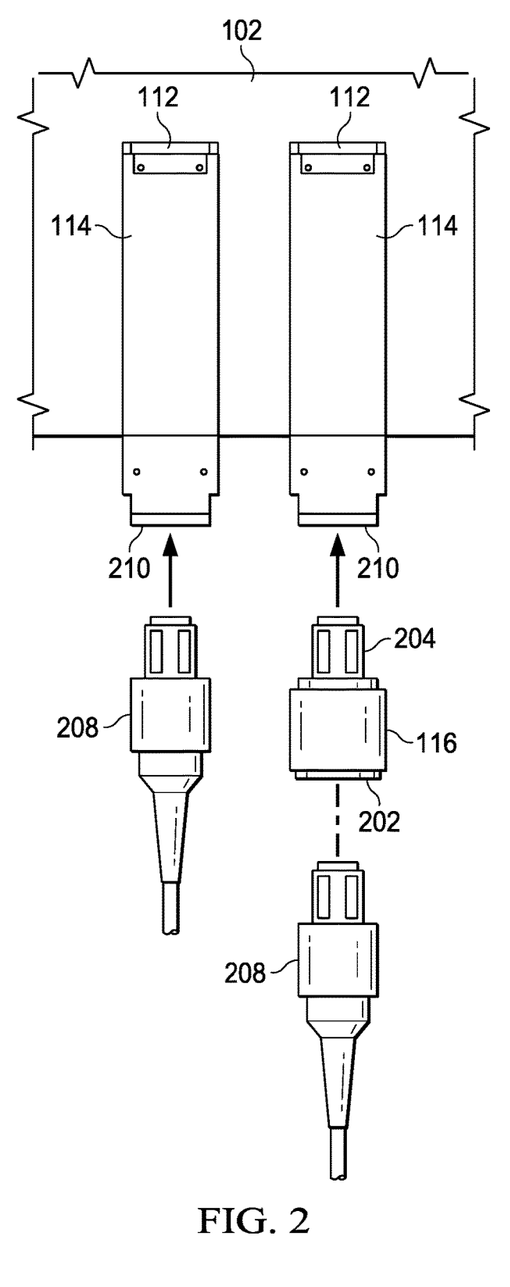
FIG. 2 illustrates a top plan view of selected components of an example information handling system, in accordance with embodiments of the present disclosure.

FIG. 2 illustrates a top plan view of selected components of example information handling system 102, in accordance with embodiments of the present disclosure. In particular, FIG. 2 illustrates a portion of information handling system 102 having optical ports 112 each with an optical transceiver module 114 inserted therein. Each optical transceiver module 114 may include a release latch 210 that may mechanically secure an optical transceiver module 114 in a corresponding optical port 112 when such release latch is engaged. FIG. 2 depicts the insertion of a cable 208 directly into an optical transceiver module 114, as well as insertion of a male connector 204 of transceiver lock insert 116 into a female connector of optical transceiver module 114, and in turn insertion of a cable 208 into a female connector 202 of transceiver lock insert 116. As is at least somewhat shown in FIG. 2, presence of transceiver lock insert 116 may prevent physical access of a person to release latch 210, thus securing optical transceiver module 114 within optical port 112.

Figure 3:
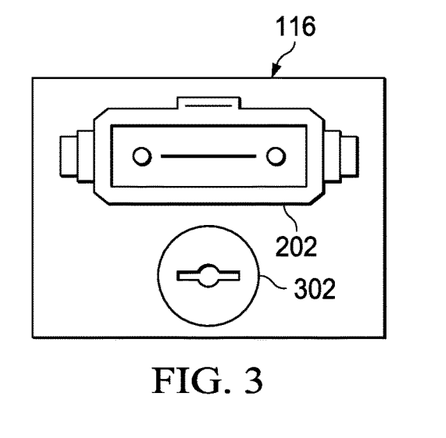
FIG. 3 illustrates a front elevation view of an example transceiver lock insert, in accordance with embodiments of the present disclosure.

FIG. 3 illustrates a front elevation view of an example transceiver lock insert 116, in accordance with embodiments of the present disclosure. As shown in FIG. 3, the front of transceiver lock insert 116 may include, in addition to female connector 202, a lock 302 including a keyhole for insertion of a key. Using the key, a user may mechanically interact with lock 302 to translate lock 302 between a locked position in which lock 302 mechanically secures transceiver lock insert 116 to optical transceiver module 114 and an unlocked position which may allow removal of transceiver lock insert 116 from optical transceiver module 114.

Figure 4A:
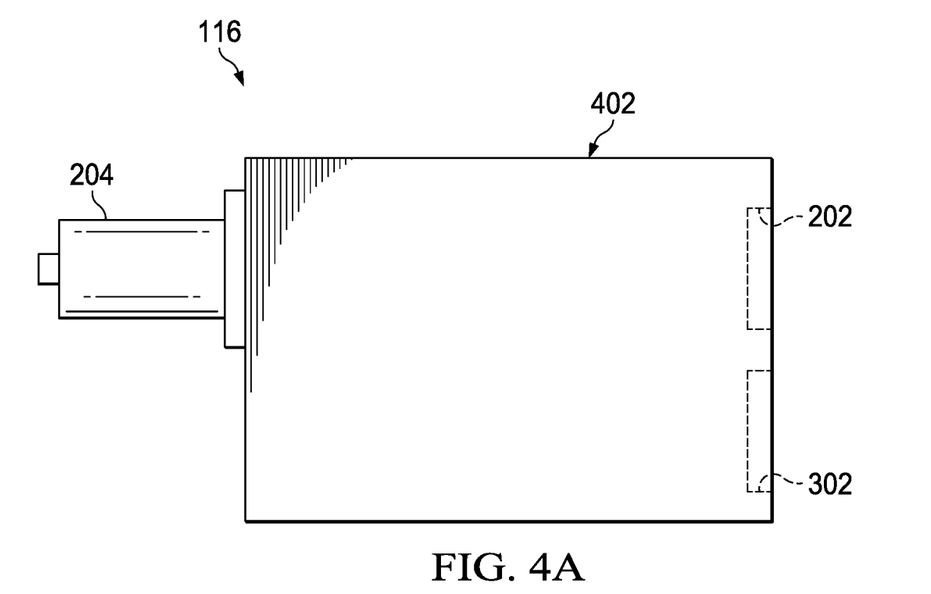
FIG. 4A illustrates a side elevation view of an example transceiver lock insert, in accordance with embodiments of the present disclosure.
Figure 4B:
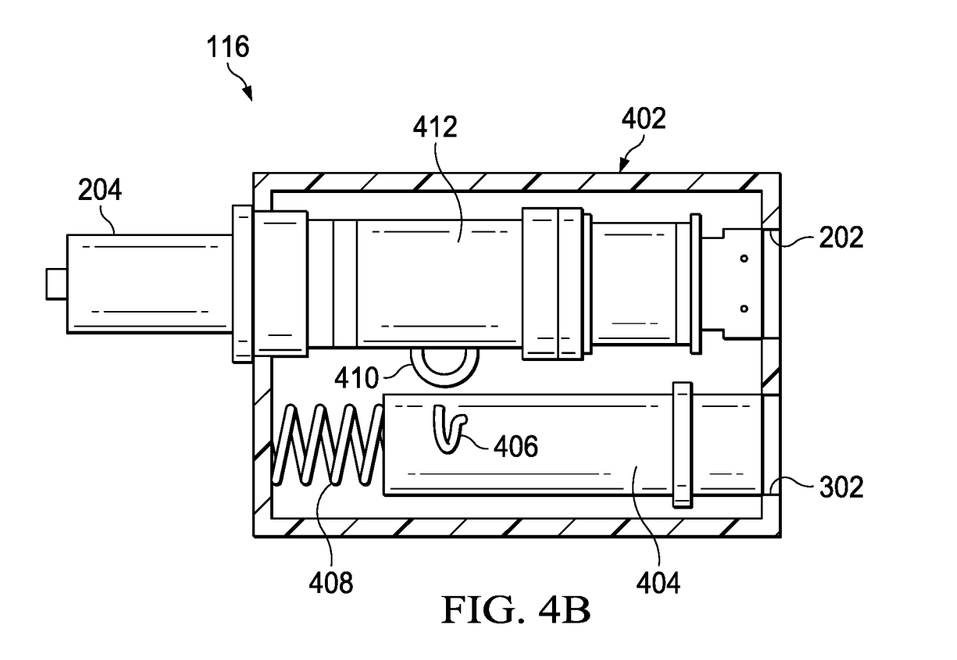
FIG. 4B illustrates a side elevation cut-away view of an example transceiver lock insert, in accordance with embodiments of the present disclosure.

FIG. 4A illustrates a side elevation view of example transceiver lock insert 116, in accordance with embodiments of the present disclosure. FIG. 4B illustrates a side elevation cut-away view of an example transceiver lock insert 116, with a portion of its housing 402 removed to depict selected internal components of transceiver lock insert 116, in accordance with embodiments of the present disclosure.

As shown in FIGS. 4A and 4B, transceiver lock insert 116 may include housing 402 to house various components, female connector 202, male connector 204, lock 302 (including lock plug 404 and lock plug hook 406), retention spring 408, optical pass-through 412, and release sleeve hoop 410 mechanically coupled to optical pass-through 412.

Lock plug 404 may include a cylinder rotatably coupled to housing 402 such that lock plug 404 may be translated from the locked position to the unlocked position (and vice versa) when a key is inserted into lock 302. In the locked position, lock plug hook 406 may engage with optical transceiver module 114 to mechanically secure transceiver lock insert 116 to optical transceiver module 114. Further, in the unlocked position, lock plug hook 406 may mechanically engage with release sleeve hoop 410 to activate a release sleeve of transceiver lock insert 116 to release transceiver lock insert 116 from optical transceiver module 114.

Retention spring 408 may comprise any suitable system, device, or apparatus mechanically coupled to lock plug 408 and configured to bias lock plug 404 to its locked position, such that lock plug 404 may be translated from the locked position to the unlocked position when a force is applied (e.g., by a user inserting a key into lock 302 and applying a suitable force) to overcome the spring force of retention spring that biases lock plug 404 into its locked position.

Release sleeve hoop 410 may be mechanically coupled to pass-through 412 or another structural component of transceiver lock insert 116 and may be arranged such that when lock plug hook 406 mechanically engages with release sleeve hoop 410, a release sleeve of transceiver lock insert 116 releases transceiver lock insert 116 from optical transceiver module 114.

Optical pass-through 412 may be communicatively coupled between female connector 402 and male connector 404 and may comprise optical transmission media configured to allow for uninterrupted and unaltered transmission of data between optical transceiver module 114 and a cable 208 inserted into transceiver lock insert 116.

Figure 5A:
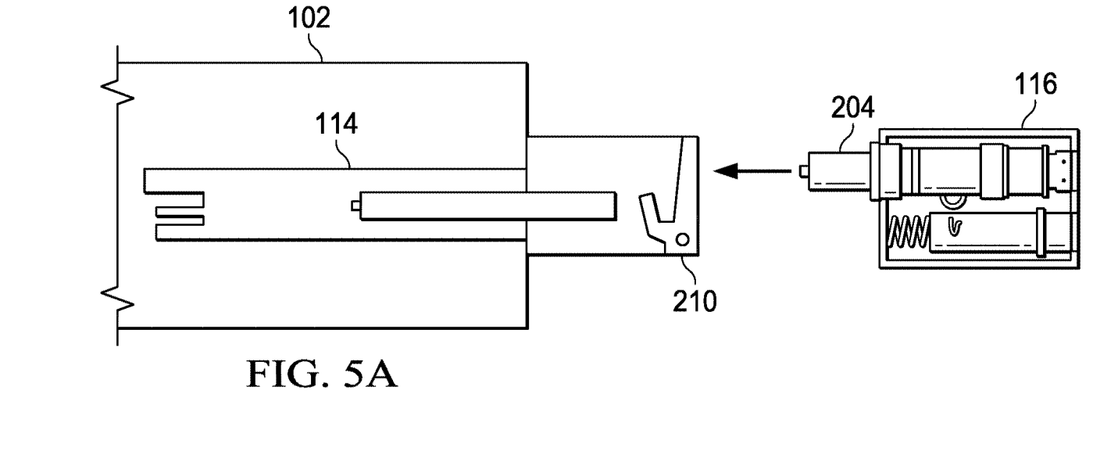
FIG. 5A illustrates insertion of an example transceiver lock insert into an optical transceiver module, in accordance with embodiments of the present disclosure.

FIG. 5A illustrates insertion of transceiver lock insert 116 into optical transceiver module 114, in accordance with embodiments of the present disclosure. As shown in FIG. 5A, to insert transceiver lock insert 116 into optical transceiver module 114, a person may engage male connector 204 to a counterpart female connector of optical transceiver module 114, such that transceiver lock insert 116 covers and prevents access to release latch 210, as shown in FIG. 5B.

Figure 5B:
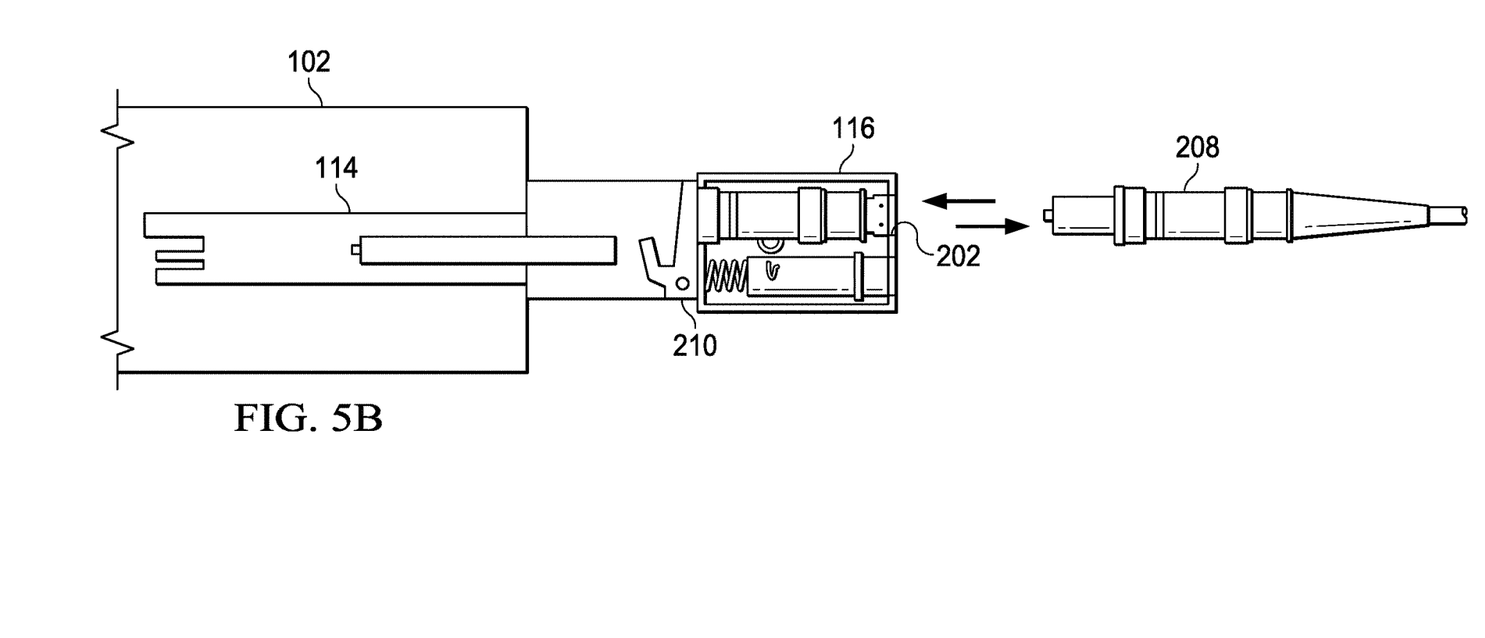
FIG. 5B illustrates insertion of a cable into a transceiver lock insert already inserted into an optical transceiver module, in accordance with embodiments of the present disclosure.

FIG. 5B illustrates insertion of a cable 208 into transceiver lock insert 116 already inserted into optical transceiver module 114, in accordance with embodiments of the present disclosure. As shown in FIG. 5B, when transceiver lock insert 116 is inserted into optical transceiver module 114, cable 208 may be readily inserted into transceiver lock insert 116 (e.g., by inserting a male connector of cable 208 into corresponding female connector 202 of transceiver lock insert 116), thus communicatively coupling cable 208 to optical transceiver module 114 via transceiver lock insert 116, and may be readily removed from transceiver lock insert 116 when desired to decouple cable 208 from optical transceiver module 114.

Figure 6A:
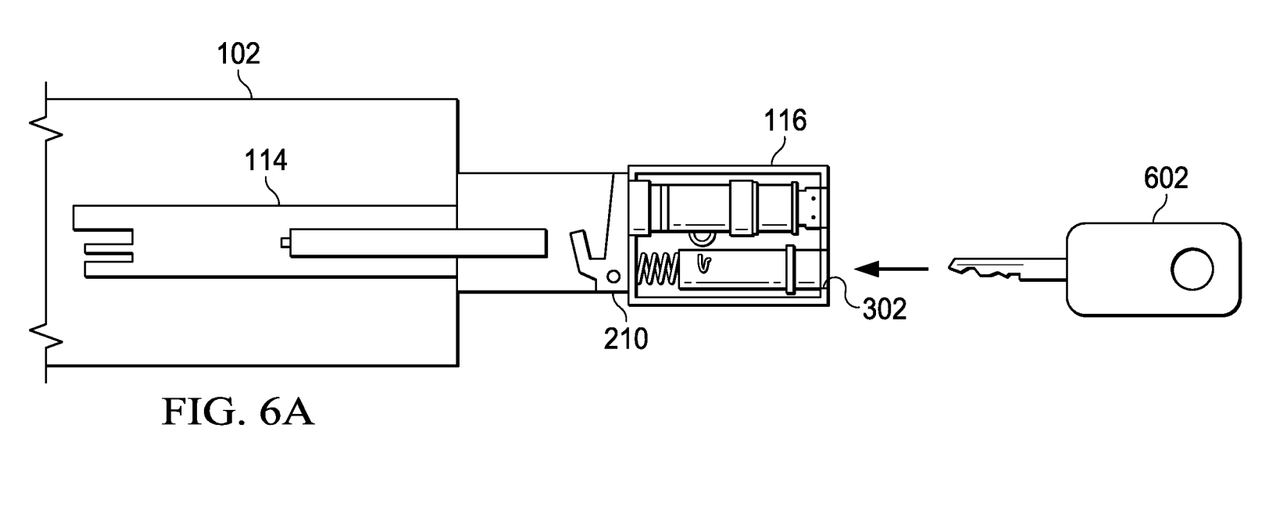
FIGS. 6A-6E illustrate removal of an example transceiver lock insert from an optical transceiver module, in accordance with embodiments of the present disclosure.
Figure 6B:
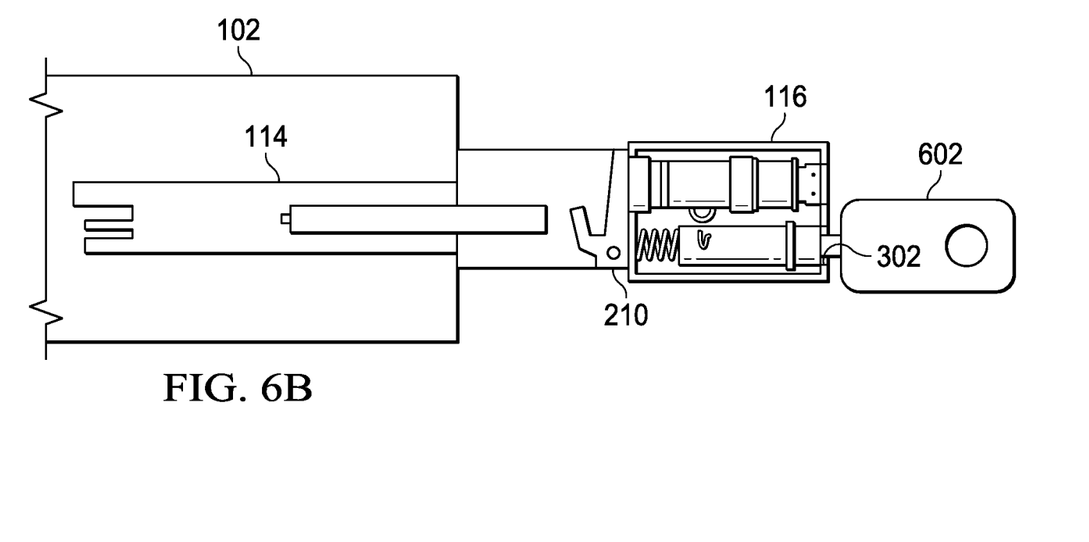
Figure 6C:
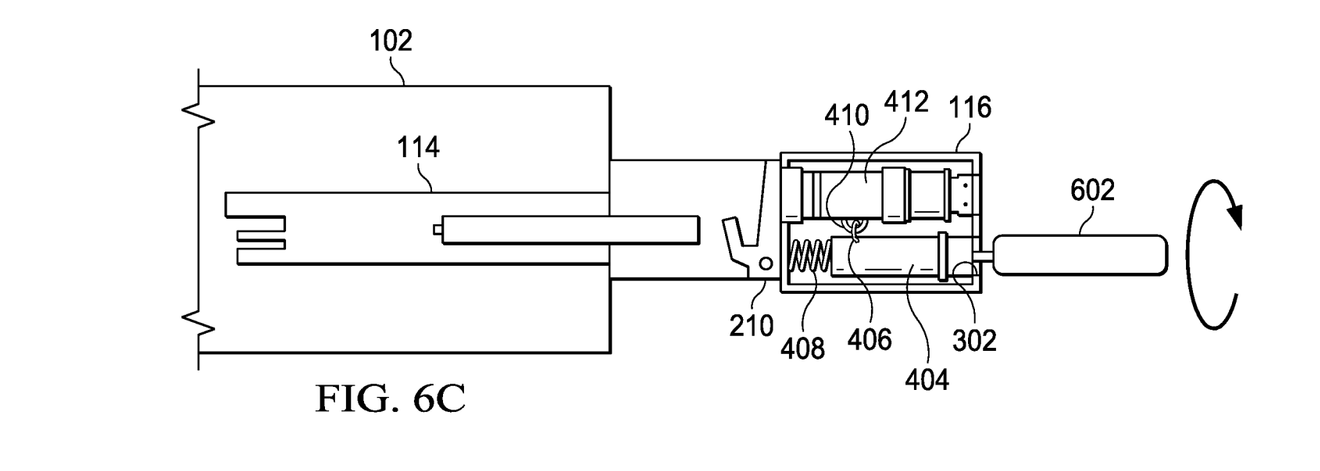
Figure 6D:
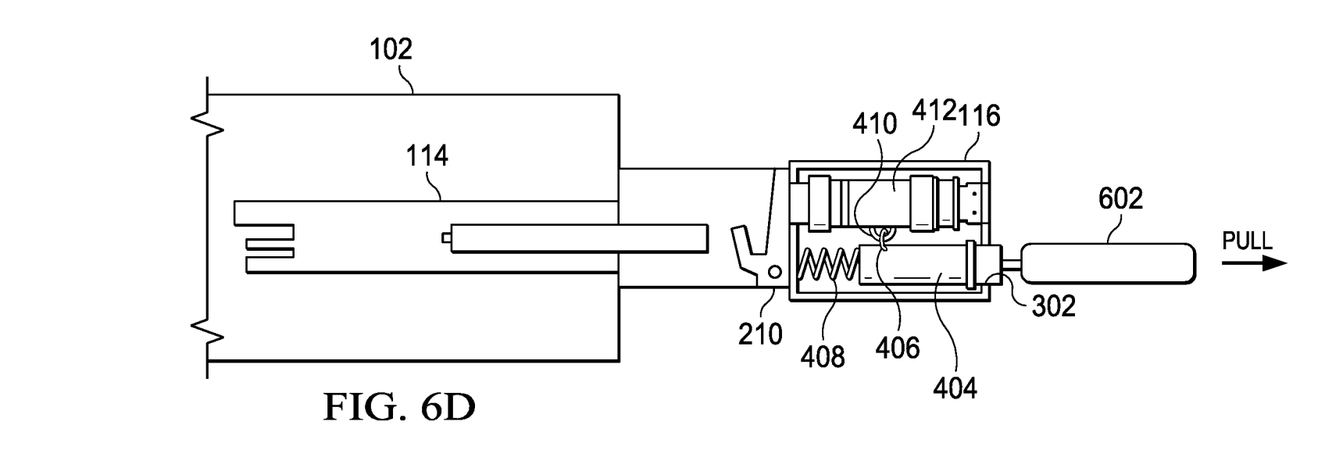
Figure 6E:
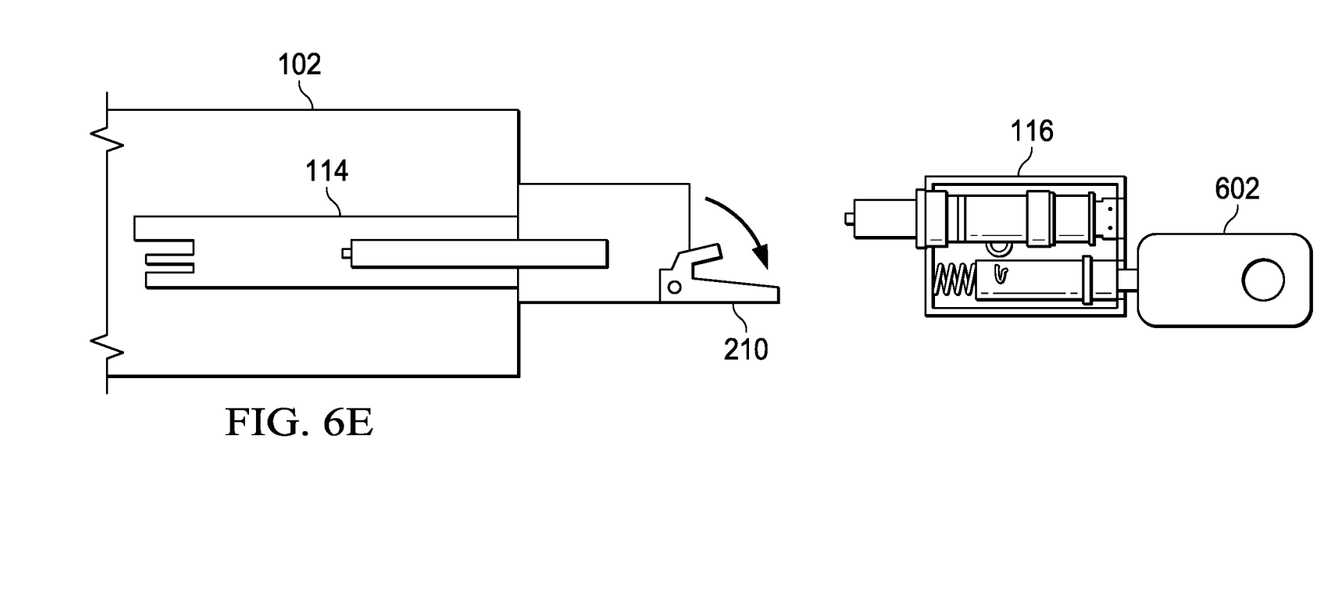

FIGS. 6A-6E may chronologically illustrate removal of transceiver lock insert 116 from optical transceiver module 114, in accordance with embodiments of the present disclosure. Once transceiver lock insert 116 is locked to optical transceiver module 114, a person may begin the process of removal of transceiver lock insert 116 from optical transceiver module 114 by inserting a key 602 associated with lock 302 into a keyhole of lock 302, as shown in FIGS. 6A and 6B. The person may then turn key 602, causing rotation of lock plug 404 such that lock plug hook 406 moves from the locked position to the unlocked position and engages with release sleeve hoop 410, as shown in FIG. 6C. Once lock plug hook 406 engages with release sleeve hoop 410, the person may pull outward on key 602 and/or transceiver lock insert 116 in order to remove transceiver lock insert 116 from optical transceiver module 114 as shown in FIG. 6D. With transceiver lock insert 116 absent from optical transceiver module 114, a person may interact with release latch 210 to disengage release latch 210, as shown in FIG. 6E. With release latch 210 disengaged, a person may readily remove optical transceiver module 114 from an optical port 112.

Although the foregoing contemplates the use of the methods and systems disclosed herein in direct attached copper and active optical cable solutions, embodiments disclosed herein may be extended for use in unique form factors and constraints of pluggable optical transceivers.

Although the foregoing contemplates the use of the methods and systems disclosed herein with respect to cable-attached optical transceiver modules, the heat transfer techniques disclosed herein may be applied generally to any active device module having a heat-generating device coupled to a cable, including without limitation transceiver modules other than optical transceiver modules.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A transceiver lock insert, comprising:
   a housing;
   a first connector housed at least partially within the housing and configured to communicatively and mechanically couple to a transceiver module;

a second connector housed at least partially within the housing and configured to communicatively and mechanically couple to a cable;
transmission media communicatively coupled between the first connector and the second connector and configured to communicatively couple the transceiver module to the cable; and
a lock housed within the housing and configured to, when the transceiver lock insert is inserted into the transceiver module, secure the transceiver lock insert to the transceiver module to cause the housing to physically cover and prevent physical access by a person to a mechanical release mechanism of the transceiver module.

2. The transceiver lock insert of claim 1, wherein the first connector comprises a male connector.

3. The transceiver lock insert of claim 1, wherein the second connector comprises a female connector.

4. The transceiver lock insert of claim 1, further comprising:
a release sleeve hoop housed within the housing;
wherein:
the lock comprises a lock plug rotatably coupled to the housing, the lock plug having a lock plug hook extending therefrom; and
the lock plug, lock plug hook, and release sleeve hoop are configured such that when the lock plug is rotated from a locked position to an unlocked position, the lock plug engages with the release sleeve hoop to activate a release sleeve of the transceiver lock insert to release the transceiver lock insert from the transceiver module.

5. The transceiver lock insert of claim 1, wherein the transceiver module is an optical transceiver module.

6. The transceiver lock insert of claim 1, wherein the transmission media comprises optical transmission media.

7. A method, comprising:
housing a first connector at least partially within a housing wherein the first connector is configured to communicatively and mechanically couple to a transceiver module;
housing a second connector at least partially within the housing wherein the second connector is configured to communicatively and mechanically couple to a cable;
communicatively coupling transmission media between the first connector and the second connector, wherein the transmission media is configured to communicatively couple the transceiver module to the cable; and
housing a lock within the housing, wherein the lock is configured to, when a transceiver lock insert is inserted into the transceiver module, secure the transceiver lock insert to the transceiver module to cause the housing to physically cover and prevent physical access by a person to a mechanical release mechanism of the transceiver module.

8. The method of claim 7, wherein the first connector comprises a male connector.

9. The method of claim 7, wherein the second connector comprises a female connector.

10. The method of claim 7, further comprising:
housing a release sleeve hoop within the housing;
wherein:
the lock comprises a lock plug rotatably coupled to the housing, the lock plug having a lock plug hook extending therefrom; and
the lock plug, lock plug hook, and release sleeve hoop are configured such that when the lock plug is rotated from a locked position to an unlocked position, the lock plug engages with the release sleeve hoop to activate a release sleeve of the transceiver lock insert to release the transceiver lock insert from the transceiver module.

11. The method of claim 7, wherein the transceiver module is an optical transceiver module.

12. The method of claim 7, wherein the transmission media comprises optical transmission media.

13. An information handling system, comprising:
a processor;
a transceiver module communicatively coupled to the processor; and
a transceiver lock insert, mechanically and communicatively coupled to the transceiver module and comprising:
a housing;
a first connector housed at least partially within the housing and configured to communicatively and mechanically couple to the transceiver module;
a second connector housed at least partially within the housing and configured to communicatively and mechanically couple to a cable;
transmission media communicatively coupled between the first connector and the second connector and configured to communicatively couple the transceiver module to the cable; and
a lock housed within the housing and configured to, when the transceiver lock insert is inserted into the transceiver module, secure the transceiver lock insert to the transceiver module to cause the housing to physically cover and prevent prevent access by a person to a mechanical release mechanism of the transceiver module.

14. The information handling system of claim 13, wherein the first connector comprises a male connector.

15. The information handling system of claim 13, wherein the second connector comprises a female connector.

16. The information handling system of claim 13, the transceiver lock insert further comprising:
a release sleeve hoop housed within the housing;
wherein:
the lock comprises a lock plug rotatably coupled to the housing, the lock plug having a lock plug hook extending therefrom; and
the lock plug, lock plug hook, and release sleeve hoop are configured such that when the lock plug is rotated from a locked position to an unlocked position, the lock plug engages with the release sleeve hoop to activate a release sleeve of the transceiver lock insert to release the transceiver lock insert from the transceiver module.

17. The information handling system of claim 13, wherein the transceiver module is an optical transceiver module.

18. The information handling system of claim 13, wherein the transmission media comprises optical transmission media.

* * * * *